(12) United States Patent
Kato et al.

(10) Patent No.: US 9,340,109 B2
(45) Date of Patent: May 17, 2016

(54) INDUSTRIAL VEHICLE AND METHOD FOR CONTROLLING INDUSTRIAL VEHICLE

(71) Applicant: KABUSHIKI KAISHA TOYOTA JIDOSHOKKI, Kariya-shi, Aichi-ken (JP)

(72) Inventors: Norihiko Kato, Kariya (JP); Yukikazu Koide, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/319,780

(22) Filed: Jun. 30, 2014

(65) Prior Publication Data

US 2015/0012187 A1 Jan. 8, 2015

(30) Foreign Application Priority Data

Jul. 3, 2013 (JP) ................................. 2013-139692

(51) Int. Cl.
*B60K 28/04* (2006.01)
(52) U.S. Cl.
CPC ............. *B60K 28/04* (2013.01); *B60Y 2200/62* (2013.01)
(58) Field of Classification Search
None
See application file for complete search history.

(56) References Cited

U.S. PATENT DOCUMENTS

| | | | | |
|---|---|---|---|---|
| 4,116,296 A | * | 9/1978 | Pleier | B60T 11/103 180/273 |
| 4,509,614 A | | 4/1985 | Bando et al. | |
| 5,156,232 A | * | 10/1992 | Muroya et al. | 180/273 |
| 5,203,440 A | * | 4/1993 | Peterson et al. | 477/171 |
| 2003/0184123 A1 | * | 10/2003 | Amamiya et al. | 296/190.01 |
| 2004/0026150 A1 | * | 2/2004 | Nishi et al. | 180/272 |
| 2007/0267238 A1 | | 11/2007 | Guy et al. | |
| 2009/0301420 A1 | * | 12/2009 | Abendroth | F02N 11/0825 123/179.4 |
| 2009/0319161 A1 | * | 12/2009 | Abendroth | 701/112 |
| 2012/0103291 A1 | * | 5/2012 | Ota et al. | 123/179.3 |
| 2014/0020967 A1 | * | 1/2014 | Nishiyama et al. | 180/65.1 |
| 2014/0149022 A1 | | 5/2014 | Geissenhoener | |

FOREIGN PATENT DOCUMENTS

| | | |
|---|---|---|
| JP | 1-155037 A | 6/1989 |
| JP | 2004-132249 A | 4/2004 |
| JP | 2004-245205 A | 9/2004 |
| JP | 2005-320087 A | 11/2005 |
| WO | 2013007347 A1 | 1/2013 |

OTHER PUBLICATIONS

Communication dated May 26, 2015 from the Japanese Patent Office in counterpart application No. 2013-139692.
Communication dated Jun. 18, 2015, issued by the Australian Intellectual Property Office in counterpart Application No. 2014203351.
Communication dated Aug. 7, 2015 from the European Patent Office in counterpart European Application No. 14174072.0.

* cited by examiner

*Primary Examiner* — Yonel Beaulieu
*Assistant Examiner* — Krishnan Ramesh
(74) *Attorney, Agent, or Firm* — Sughrue Mion, PLLC

(57) ABSTRACT

An industrial vehicle implements an automatic engine stop function that automatically stops an engine installed on a vehicle body. The industrial vehicle includes an engine starting battery arranged in the vehicle body to start the engine, an operator seat arranged on the vehicle body, a seating detector adapted to detect whether or not the operator seat is vacant, and a controller adapted to disable the automatic engine stop function if the engine is started when the seating detector detects that the operator seat is vacant.

4 Claims, 3 Drawing Sheets

INDUSTRIAL VEHICLE AND METHOD FOR CONTROLLING INDUSTRIAL VEHICLE

BACKGROUND OF THE INVENTION

The present invention relates to an industrial vehicle including an automatic engine stop function and a method for controlling the industrial vehicle.

Japanese Laid-Open Patent Publication No. 2004-132249 describes an industrial vehicle that automatically stops the engine. In the industrial vehicle, the time from when the operator leaves the operator seat is measured. When the measured time exceeds a set time, an engine stop instruction is issued to automatically stop the engine.

In an industrial vehicle having an automatic engine stop function, there may be a situation in which it is desirable that the engine continues to run even when the operator is not seated on the operator seat. For example, when the battery used to start the engine is drained, the engine may be jump-started using a battery of another vehicle or a dedicated device. In such a case, it may be desirable for the engine to continue running for a while to charge the battery.

SUMMARY OF THE INVENTION

It is an object of the present disclosure to provide an industrial vehicle operable to keep the engine running even when an operator is not seated on the operator seat and a method for controlling the industrial vehicle.

To achieve the above object, one aspect of the present invention is an industrial vehicle that implements an automatic engine stop function that automatically stops an engine installed on a vehicle body. The industrial vehicle includes an engine starting battery arranged in the vehicle body to start the engine, an operator seat arranged on the vehicle body, a seating detector adapted to detect whether or not the operator seat is vacant, and a controller adapted to disable the automatic engine stop function if the engine is started when the seating detector detects that the operator seat is vacant.

Another aspect of the present invention is a method for controlling an industrial vehicle that includes a vehicle body, an engine, an engine starting battery for starting the engine, and an operator seat. The industrial vehicle implements an automatic engine stop function that automatically stops the engine. The method includes determining whether or not the operator seat is vacant when the engine is started, and disabling the automatic engine stop function when determining that the operator seat is vacant when the engine is started.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

Figure 1:
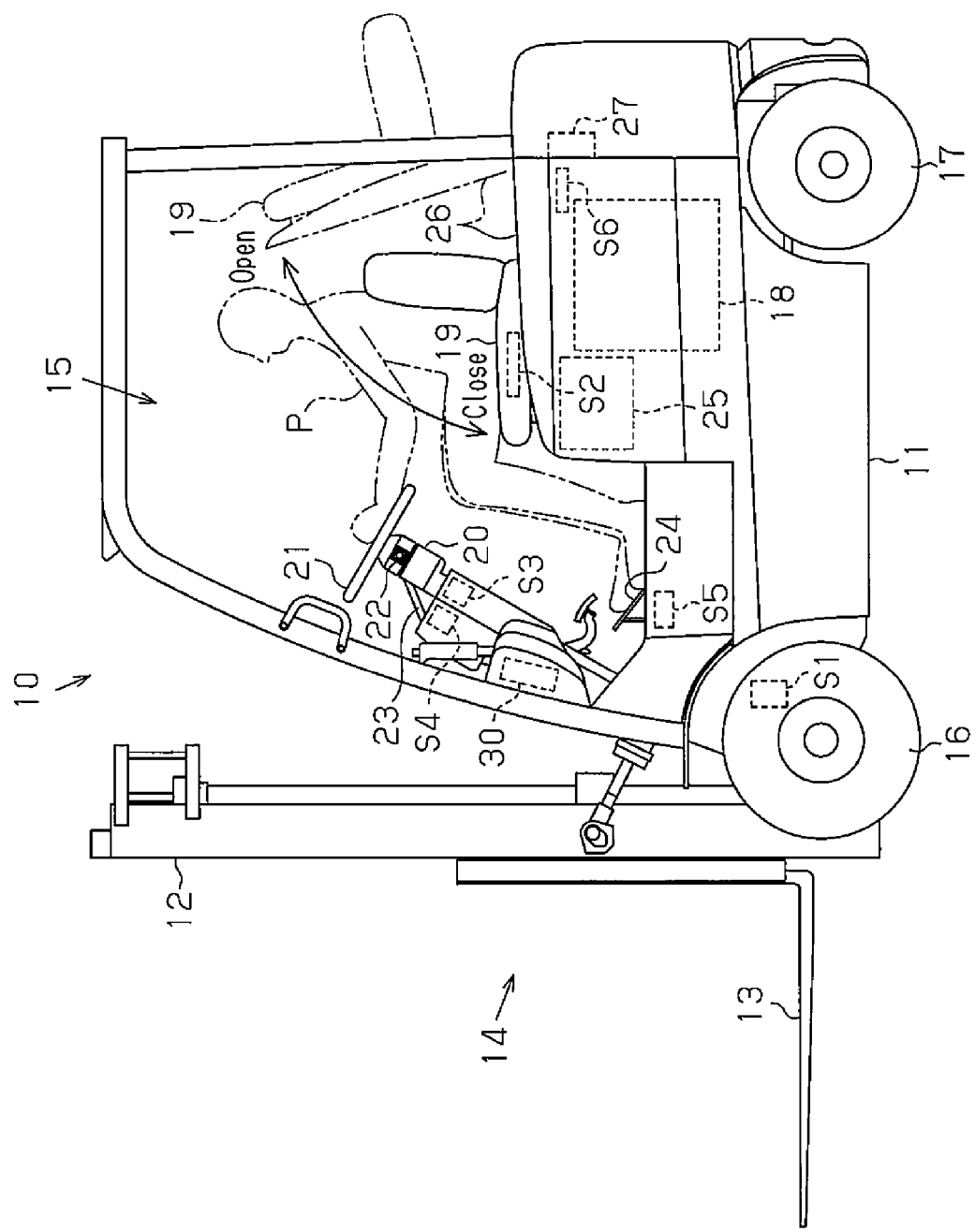
FIG. 1 is a side view showing a forklift.

A first embodiment will now be described referring to the drawings.

As shown in FIG. 1, a forklift 10, which is an industrial vehicle, includes a vehicle body 11 and a material handling device 14 located in front of the vehicle body 11. The material handling device 14 includes a mast 12 and a fork 13. The central section of the vehicle body 11 includes an operator cab 15. The lower front section of the vehicle body 11 includes drive wheels (front wheels) 16. The lower rear section of the vehicle body 11 includes steered wheels 17. The drive wheels 16 are coupled to an engine 18 through a transmission (not shown). The engine 18 is installed in the vehicle body 11. The forklift 10 of the present embodiment is an engine forklift powered by the engine 18, which rotates the drive wheels 16. A vehicle speed sensor S1 for detecting the vehicle speed of the forklift 10 is arranged at a position corresponding to the drive wheels 16. The vehicle speed sensor S1 outputs a detection signal in accordance with the vehicle speed.

The operator cab 15 includes an operator seat 19 on which an operator P who operates the forklift 10 sits. The operator seat 19 includes a seating sensor (switch) S2. The seating sensor S2 detects whether or not the operator P is taking a driving position and seated on the operator seat 19. The seating sensor S2 outputs the detection results as detection signals.

A steering wheel column 20 is arranged in front of the operator seat 19 in the operator cab 15. The steering wheel column 20 is coupled to a steering wheel 21. The steering wheel 21 is operated to change the angle of the steered wheels 17.

The steering wheel column 20 includes a start switch key (not shown), which starts and stops the engine 18, and a key sensor S3, which detects the operation position of the start switch key and outputs the detection results as detection signals.

The steering wheel column 20 also includes a shift lever 22 that instructs the driving direction of the forklift 10. The shift lever 22 is used to select and instruct forward and backward driving directions. Further, the steering wheel column 20 includes material handling levers 23, which include a lift lever and a tilt lever. The lift lever is operated to lift and lower the fork 13. The tilt lever is operated to tilt the entire material handling device 14 forward and rearward. When the forklift 10 handles a material, the material handling levers 23 are operated to operate the material handling device 14. The steering wheel column 20 also includes a material handling detection sensor S4 that detects operations of the material handling levers 23 and outputs a corresponding detection signal.

An accelerator pedal 24 is arranged in front of a lower portion of the operator seat 19. The accelerator pedal 24 is used to instruct acceleration (driving) of the forklift 10 and adjusts the driving speed. The vehicle body 11 includes an accelerator depression amount sensor S5 that detects the depression amount of the accelerator pedal 24, or the accelerator depression amount, and outputs a corresponding detection signal.

An engine starting battery 25 is installed in the vehicle body 11. The power of the engine starting battery 25 drives the starter motor of the engine 18 and injects fuel to start the engine 18.

The vehicle body 11 includes a hood (engine hood) 26 extending in the horizontal direction. The hood 26 is supported to be pivotal about its rear end so that the hood 26 can open and close. The hood 26 opens by pivoting to the position indicated by the double-dashed lines in FIG. 1. When the hood 26 is closed, the engine 18 and the engine starting battery 25 are located under the hood 26, and the operator seat 19 is located above the hood 26. When the hood 26 is open, the positive and negative terminals on the upper side of the engine starting battery 25 are exposed. The engine 18 may be started by connecting the exposed positive and negative terminals to a battery of other vehicle, for example.

Figure 2:
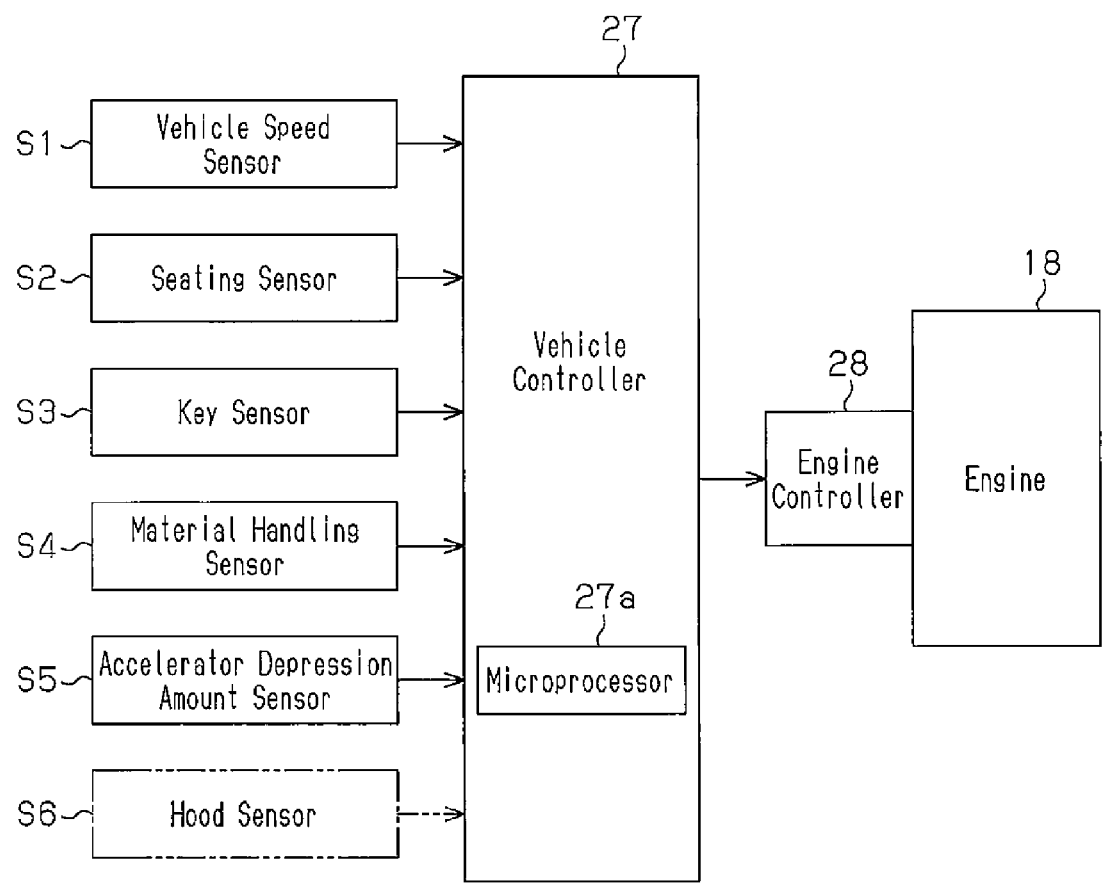
FIG. 2 is a block diagram showing the electric structure of the forklift of FIG. 1.

In addition, the vehicle body 11 includes a vehicle controller 27, which is mainly formed by a microprocessor 27a (FIG. 2). The vehicle controller 27 is activated by turning the start switch key to an on position.

As shown in FIG. 2, the vehicle controller 27 is electrically connected to the vehicle speed sensor S1, the seating sensor S2, the key sensor S3, the material handling detection sensor S4, and the accelerator depression amount sensor S5. The vehicle controller 27 receives a vehicle speed signal from the vehicle speed sensor S1, a seating signal from the seating sensor S2, a key operation detection signal from the key sensor S3, a material handling detection signal from the material handling detection sensor S4, and an accelerator depression amount detection signals from the accelerator depression amount sensor S5.

Based on the detection signals received from the sensors S1 to S5, the microprocessor 27a of the vehicle controller 27 detects the vehicle speed, the seating of the operator P on the operator seat 19, the position of the start switch key, material handling, and the accelerator depression amount. The vehicle controller 27 is connected to an engine controller 28, and the microprocessor 27a controls the engine 18 with the engine controller 28 based on the detection signals received from the sensors S1 to S5.

The forklift 10 has a function to automatically stop the engine 18 (automatic engine stop function). The microprocessor 27a of the vehicle controller 27 is configured to automatically stop the engine 18.

The operation of the forklift 10 will now be described.

Figure 3:
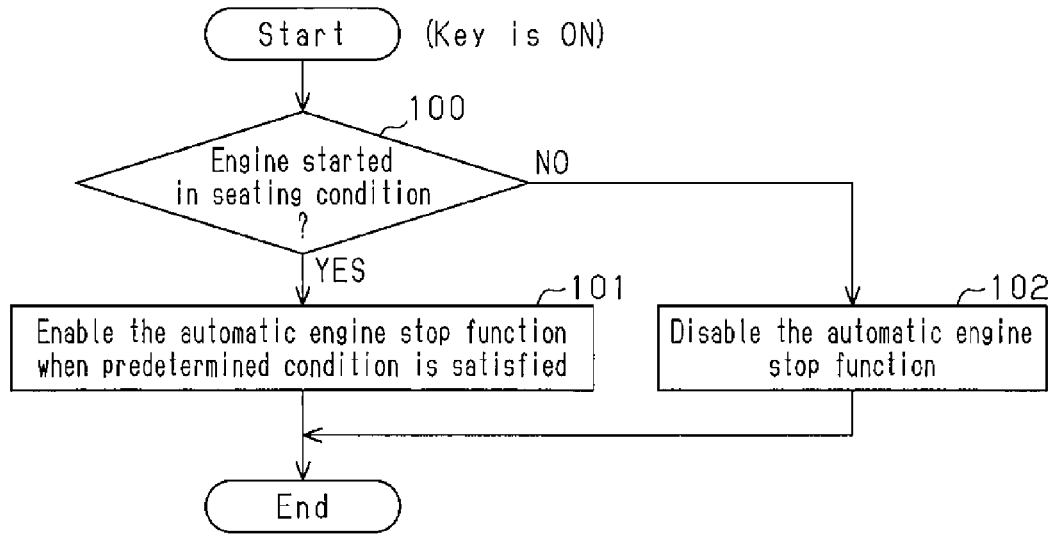
FIG. 3 is a flowchart showing the operation of a forklift in a first embodiment.

As shown in FIG. 3, when the start switch key is at the on position and the vehicle controller 27 is activated, the microprocessor 27a determines in step 100 whether or not the engine 18 has been started when the operator P is seated on the operator seat 19 and the seating sensor S2 is activated. If the microprocessor 27a determines that the engine 18 has been started when the operator P is seated on the operator seat 19 and the seating sensor S2 is activated, the microprocessor 27a proceeds to step 101. In step 101, when a predetermined condition is satisfied, for example, when the vehicle speed is null, the microprocessor 27a enables the automatic engine stop function that automatically stops the engine 18. Thus, the microprocessor 27a automatically stops the engine 18 when a predetermined time elapses from when the operator P leaves the operator seat 19, for example.

In step 100, if the microprocessor 27a determines that the engine 18 has been started when the operator P is not seated on the operator seat 19 and the seating sensor S2 is deactivated, the microprocessor 27a proceeds to step 102. In step 102, the microprocessor 27a disables the automatic engine stop function. In other words, if the engine 18 is started when the seating sensor S2 detects that the operator P is not seated on the operator seat 19, the automatic engine stop function is disabled. Accordingly, when the engine 18 is jump-started due to drainage of the engine starting battery 25, the automatic engine stop function is disabled. This allows for the charging of the engine starting battery 25 by the engine 18.

More specifically, when the engine starting battery 25 is drained, the battery of another vehicle or a dedicated device is connected to the engine starting battery 25 to jump-start the engine 18. In this case, the engine 18 needs to remain running even when the operator P is not seated on the operator seat 19. In the forklift 10, the engine starting battery 25 is arranged under the engine hood 26 (under the operator seat 19). Thus, when jump-starting the engine 18, the operator P is not seated on the operator seat 19. In a conventional forklift in which the automatic engine stop function is not disabled, if the engine is automatically stopped after a short time, the engine may be stopped before the operator sits on the operator seat after disconnecting the battery of another vehicle or the dedicated device.

In the forklift 10 of the present embodiment, if the engine 18 is started when the operator seat 19 is vacant, such as when the engine 18 is jump-started, the automatic engine stop function is disabled and the engine 18 is not automatically stopped while the engine starting battery 25 is being charged. Accordingly, the engine 18 continues to run and allows for the charging of the engine starting battery 25. During normal operations, when the operator P leaves the operator seat 19, the automatic engine stop function is enabled to automatically stop the engine 18.

The advantages of the present embodiment will now be described.

(1) The forklift 10 includes the seating sensor S2, which functions as a seating detector, and the microprocessor 27a, which functions as a controller.

The seating sensor S2 detects whether or not the operator seat 19 is vacant. If the engine 18 is started when the operator seat 19 is detected as being vacant, the microprocessor 27a disables the automatic engine stop function. Thus, when the engine 18 is jump-started due to drainage of the engine starting battery 25, the automatic engine stop function is disabled. This allows for the charging of the engine starting battery 25. Accordingly, the engine 18 may continue to run even when the operator P is not seated on the operator seat 19, such as when the engine 18 is jump-started due to drainage of the engine starting battery 25.

Second Embodiment

A second embodiment will now be described focusing on the differences from the first embodiment.

As shown in FIG. 1, the forklift 10 of the present embodiment includes a hood sensor (switch) S6 that detects opening and closing of the hood (engine hood) 26 and sends a corresponding detection signals to the vehicle controller 27 (FIG. 2).

Figure 4:
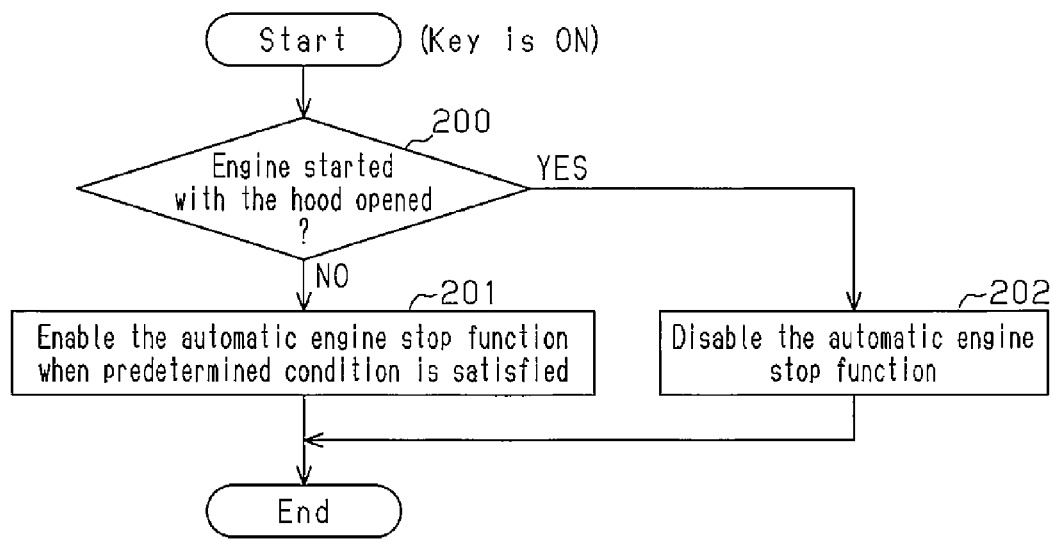
FIG. 4 is a flowchart showing the operation of a forklift in a second embodiment.

As shown in FIG. 4, when the start key switch is at the on position and the vehicle controller 27 is activated, the microprocessor 27a determines in step 200 whether or not the engine 18 has been started when the hood 26 is open and the hood sensor S6 is deactivated. If the microprocessor 27a determines that the engine 18 has been started when the hood 26 is closed and the hood sensor S6 is activated, the microprocessor 27a proceeds to step 201. In step 201, when a predetermined condition is satisfied, such as the vehicle speed being null, the microprocessor 27a enables the automatic engine stop function that automatically stops the engine 18. Thus, the microprocessor 27a automatically stops the engine 18 if a predetermined time elapses from when the operator P leaves the operator seat 19, for example.

In step 200, if the microprocessor 27a determines that the engine 18 has been started when the hood 26 is open and the hood sensor S6 is deactivated, the microprocessor 27a proceeds to step 202. In step 202, the microprocessor 27a disables the automatic engine stop function. In other words, the automatic engine stop function is disabled when the engine 18 is started when the hood sensor S6 detects that the hood 26 is open and the operator seat 19 is vacant. This overcomes a problem that occurs when the engine starting battery 25 is drained and the engine 18 is jump-started by connecting the battery of another vehicle. The disablement of the automatic engine stop function prevents automatic stopping of the engine 18 while the engine starting battery 25 is being charged. This allows for the charging of the engine starting battery 25 by the engine 18.

As described above, the automatic engine stop function is enabled or disabled based on the detection of the opening and closing of the hood 26. Further, the forklift 10 may include an engine start interlock system that prevents the engine 18 from starting unless the brake pedal or the clutch pedal is depressed when the hood 26 is closed. In this case, when the hood 26 is open, the automatic engine stop function can be disabled and the engine 18 can be started even when the brake pedal or the clutch pedal is not depressed.

Accordingly, the second embodiment has the following advantage in addition to advantage (1) of the first embodiment.

(2) When the hood 26, which is supported by the vehicle body 11 to be able to open and close, is closed, the engine starting battery 25 is located under the hood 26 and the operator seat 19 is located above the hood 26. The hood sensor S6 and the microprocessor 27a, which function as seating detectors, determine whether or not the operator seat 19 is vacant based on the opening and closing of the hood 26. When the hood 26 is open, the microprocessor 27a determines that the operator seat 19 is vacant. If the engine 18 is started when the operator seat 19 is determined to be vacant, the microprocessor 27a disables the engine automatic stop function.

It should be apparent to those skilled in the art that the present invention may be embodied in many other specific forms without departing from the spirit or scope of the invention. Particularly, it should be understood that the present invention may be embodied in the following form.

The industrial vehicle is not limited to a forklift.

The present examples and embodiments are to be considered as illustrative and not restrictive and the invention is not to be limited to the details given herein, but may be modified within the scope and equivalence of the appended claims.

The invention claimed is:

1. An industrial vehicle that implements an automatic engine stop function that automatically stops an engine installed on a vehicle body, the industrial vehicle comprising:
   an engine starting battery arranged in the vehicle body to start the engine;
   an operator seat arranged on the vehicle body;
   a seating detector configured to detect whether or not the operator seat is vacant; and
   a controller configured to:
   disable the automatic engine stop function based upon the engine being started when the seating detector detects that the operator seat is vacant; and
   enable the automatic engine stop function based upon the engine being started when the seating detector does not detect that the operator seat is vacant.

2. The industrial vehicle according to claim 1, further comprising a hood supported by the vehicle body to be able to open and close, wherein
   when the hood is closed, the engine starting battery is located under the hood and the operator seat is located above the hood, and
   the seating detector is configured to detect whether or not the operator seat is vacant based on the opening and closing of the hood.

3. The industrial vehicle according to claim 1, wherein the industrial vehicle is a forklift.

4. A method for controlling an industrial vehicle including a vehicle body, an engine, an engine starting battery for starting the engine, and an operator seat, wherein the industrial vehicle implements an automatic engine stop function that automatically stops the engine, the method comprising:
   determining whether or not the operator seat is vacant when the engine is started;
   disabling the automatic engine stop function when determining that the operator seat is vacant when the engine is started; and
   enabling the automatic engine stop function when determining that the operator seat is not vacant when the engine is started.

* * * * *